United States Patent [19]

Brimhall

[11] 4,050,907
[45] Sept. 27, 1977

[54] ORGANIC WASTE TREATING AND CONVERSION SYSTEM

[76] Inventor: George H. Brimhall, 435 Mirada Road, Half Moon Bay, Calif. 94109

[21] Appl. No.: 703,771

[22] Filed: July 9, 1976

[51] Int. Cl.² .............................................. C10J 3/00
[52] U.S. Cl. ................................... 48/111; 48/197 A;
  48/209; 165/84; 201/25; 210/170; 210/179;
  241/DIG. 38; 366/108
[58] Field of Search ...................... 48/197 A, 111, 209,
  48/197 R; 201/25; 241/DIG. 38; 210/179, 187,
  DIG. 22, 170; 165/84; 259/1 R, 114, DIG. 41,
  DIG. 42, DIG. 43, DIG. 44

[56] References Cited
U.S. PATENT DOCUMENTS

| 1,456,557 | 5/1923 | Imhoff | 48/197 A |
| 1,717,100 | 6/1929 | Downes | 48/197 A |
| 1,892,681 | 1/1933 | Rankin | 48/197 A |
| 1,990,523 | 2/1935 | Buswell et al. | 48/197 A |
| 2,040,270 | 5/1936 | Pool | 48/111 |
| 2,893,707 | 7/1959 | Gulton | 259/1 R |
| 3,578,072 | 5/1971 | Kolm | 165/84 |
| 3,721,217 | 3/1973 | Willach et al. | 165/84 |
| 3,981,803 | 9/1976 | Coulthard | 48/197 A |
| 3,993,458 | 11/1976 | Antal | 48/209 |

Primary Examiner—Robert L. Lindsay, Jr.
Assistant Examiner—George C. Yeung
Attorney, Agent, or Firm—Shlesinger, Arkwright, Garvey & Dinsmore

[57] ABSTRACT

An apparatus for treating any type of organic waste such as sewage, garbage, weeds and surplus crops to converts them into useful products, having a treatment tank or plurality of suchtanks, a conduit circuit for carrying a heating fluid therethrough; vibrators to vibrate the conduit to homogenize and mix the tank contents, a furnace for supplying heat to the conduit circuit with the fuel for the furnace being the gaseous product recovered from the treatment tank or tanks, and solar cells and microwave heating units to balance and maintain the supply of heat when the fuel supply to the furnace is low. Radiation diffusers may be positioned about the tank or tanks to assist in the conversion process.

33 Claims, 7 Drawing Figures

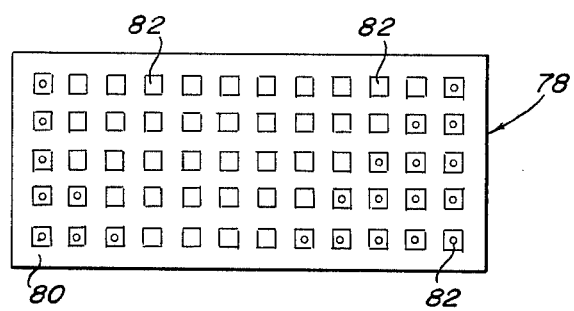
Fig. 4
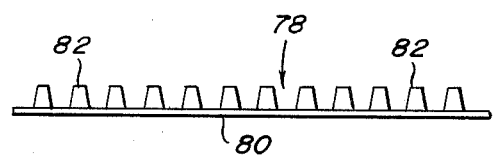
Fig. 5
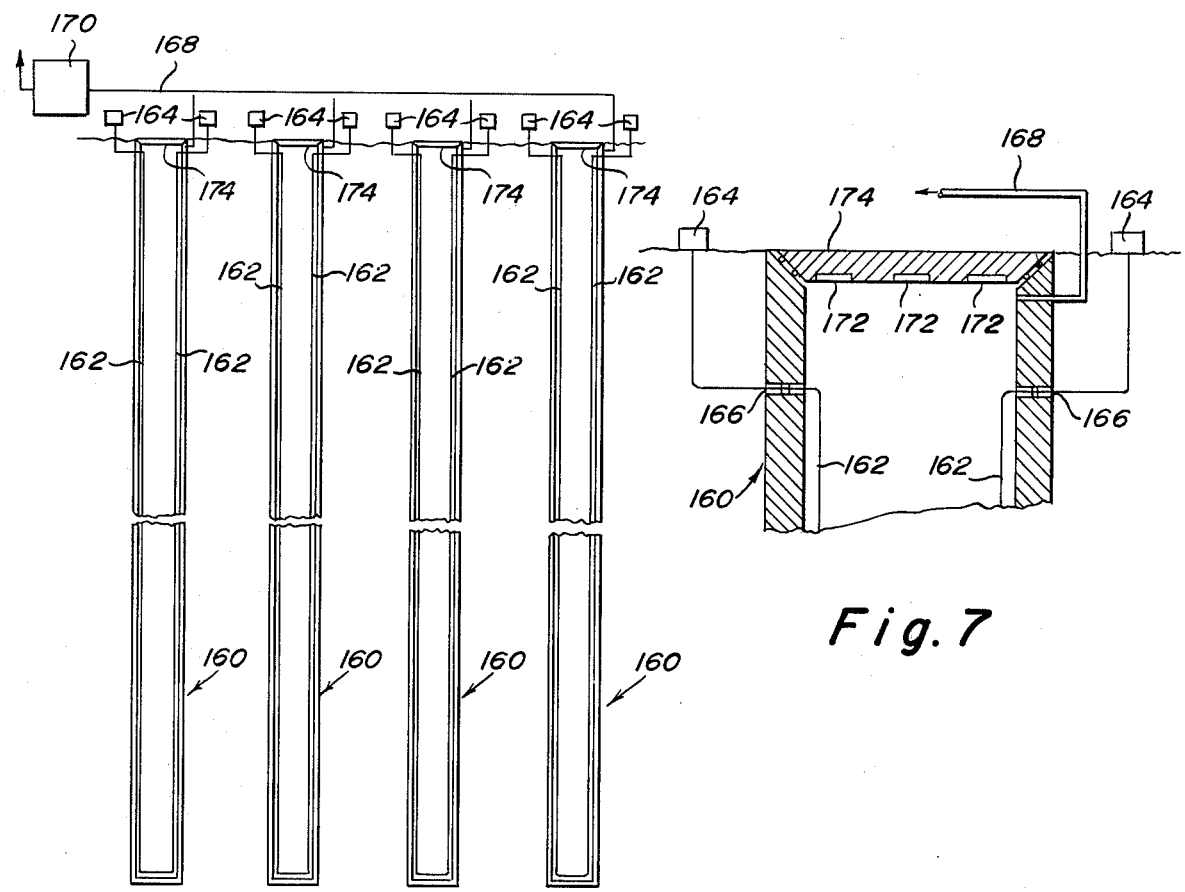
Fig. 7
Fig. 6

ORGANIC WASTE TREATING AND CONVERSION SYSTEM

BACKGROUND OF THE INVENTION

This invention generally relates to the field of organic waste material processing and concerns an apparatus and process for the treatment of any form of organic waste including sewage, garbage, surplus crops, weeds and any product of photosynthesis to convert them into useful products.

Devices for the disposal of organic waste via anaerobic digestion are known to the prior art. However, nowhere in the prior art are there devices usable domestically or publicly for the processing of any form of organic waste material which are entirely self contained needing only water, a minimal amount of electricity assisted by electromagnetic energizers and cosmic ray inhibitors, diffusers, deflectors and which result in conversion and production of usable hydrocarbon products.

SUMMARY OF THE INVENTION

An object of this invention is to overcome this deficiency in the prior art.

An object is to provide an organic waste processing system which will process any form of organic waste or surplus crops into useful hydrocarbons such as oil and gas.

An object is to provide a system designed to supply mankind an abundance of petroleum and motor fuel at the lowest possible cost, now and after we have exhausted the world's supply of fossil fuels.

Another object is to provide a system designed to eliminate the present practices of public sewage disposal plants in poisoning the air we breathe and contaminating streams, rivers, lakes and oceans.

An object is to improve the environment by using the sewer gas, which is normally exhausted to the atmosphere, as a primary medium for the conversion of waste products into a quality crude oil and other useful products.

A further object is to provide a waste processing system which is virtually self-sufficient needing only water, a minimal amount of electricity and electromagnetic and cosmic radiation.

Another object is to provide a system which may be profitably used in the processing or organic waste on any scale, ranging from large scale municipal use to use by a home owner as a domestic waste treatment plant.

A further object of this invention is to provide novel feeding and homogenizing means for treating the treatment tank contents.

These and other objects are accomplished by an organic waste processing apparatus which includes a treatment tank or a plurality of such tanks, a conduit circuit for carrying a heating fluid therethrough, vibrators to vibrate the conduit to homogenize and mix the tank contents, a furnace for supplying heat to the conduit circuit with the fuel for the furnace being the gaseous product recovered from the treatment tank or tanks and solar cells and microwave heating units to supply heat when the fuel supply to the furnace is low. When used as a domestic waste treatment plant, means for distributing excess heat, gas product and liquid product to the home for domestic use are included. Domestic sewage pipes are tied into the apparatus via the septic tank to enable processing of all the domestic organic waste.

DESCRIPTION OF THE DRAWINGS

FIG. 4 is a top plan view of the radiation diffuser of this invention;

FIG. 5 is a side elevation of FIG. 4.

FIG. 6 is a sectional view of a modification of the invention using a deep well tank system.

FIG. 7 is an enlarged fragmentary section showing a detail of the upper portion of one tank of FIG. 6.

DETAILED DESCRIPTION OF THE INVENTION

Figure 1:
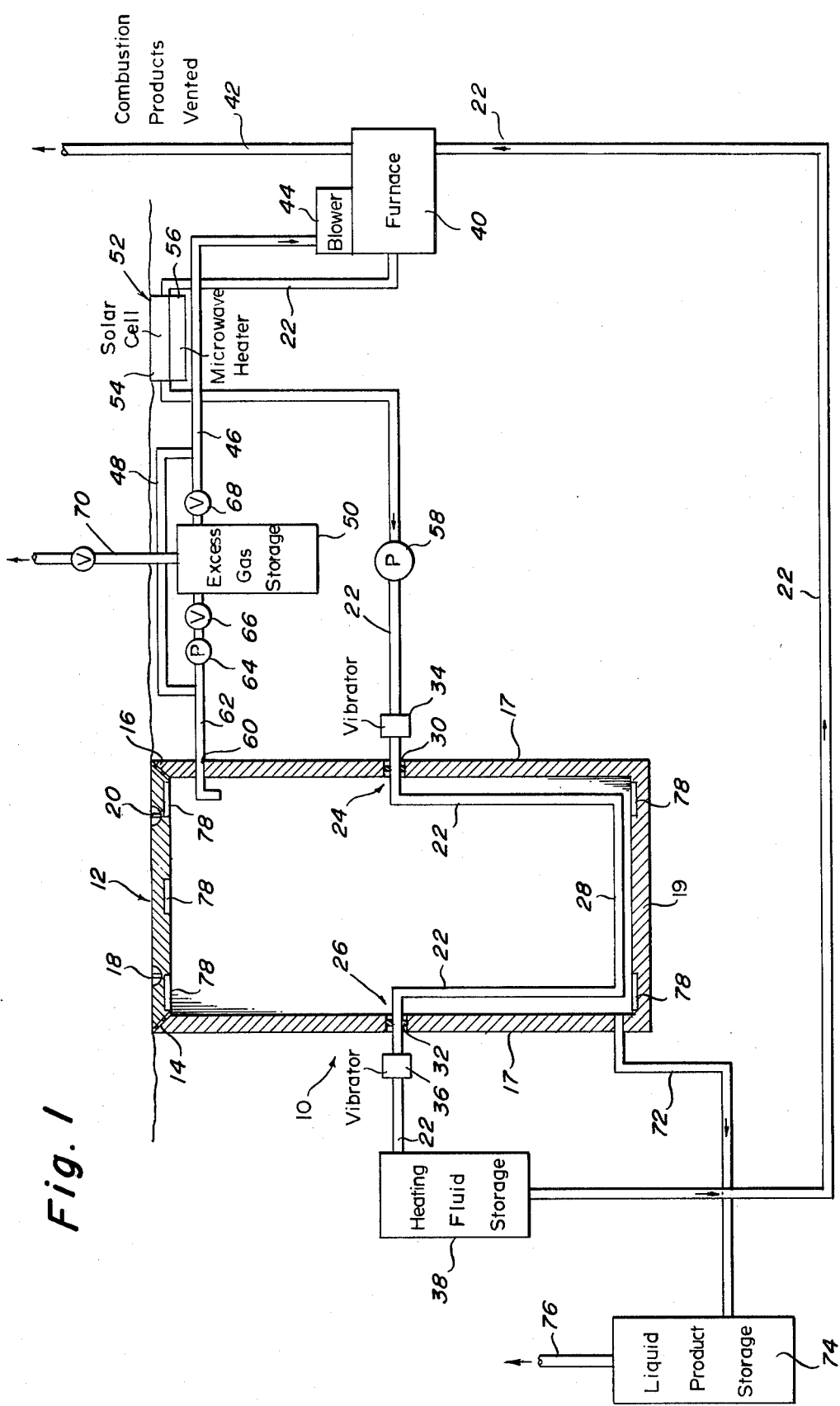
FIG. 1 is a cross sectional view of the apparatus of this invention.

FIG. 1 shows a tank 10 generally rectangular in shape, formed of concrete and situated in the ground with its top 12 at ground level. The top 12 is removable for access into the interior of the tank 10. Fluid tight seals 14, 16 are located between the top 12 and the walls 17 of the tank 10 to prevent the leakage of gas from the interior. The top 12 is held in place and the seal maintained by the weight of the top 12 which is considerable since formed of concrete. For ease of removal, the top 12 may have recessed into its surface ring bolts or threaded sockets 18, 20.

Passing through the tank 10 then out to a heating fluid storage vessel 38 and various feeding and vibratory units and finally back into the tank 10 in a complete circuit is a fluid conduit or conduit circuit 22 which functions as a heating and homogenizing means. Heat is supplied by a heated fluid, preferably water, which is pumped through the conduit 22 which may be a copper pipe.

The conduit 22 illustrated parallels the walls 17 and bottom 19 of the tank 10 between its entrance 24 and exit 26 points through the tank walls 17. The portion of the conduit 22 which passes through the tank 10 is disposed in a generally U-shaped configuration following the walls 17 and bottom 19 of the tank 10 between its entrance 24 and exit 26 points through the tank walls 17. The conduit 22 follows the bottom 19 of the tank 10 for part of its length 28 to insure maximum heating efficiency since the coldest portion of the contents of the tank 10 will be near the bottom. The entrance 24 and exit 26 points of the conduit 22 through the tank walls 17 are shown as being approximately midway between the top 12 and bottom 19 of the tank 10 but the entrance 24 and exit 26 points may be located at any height in the walls 17 of the tank 10.

The portion of the conduit circuit 22 which passes through the tank 10 is freely suspended within the tank 10. At its entrance 24 and exit 26 points to the tank 10 through channels in the tank's concrete walls 17, the conduit 22 is mounted in resilient seals 30, 32 which will permit the free vibration of the conduit 22 but prevent any leakage from the tank 10. Connected to the conduit 22 adjacent either the conduit's entrance 24 or exit 26 points to the tank or to both are vibrators 34, 36 which vibrate the portion of the conduit 22 which passes through the tank 10. The vibrator 34, 36 may operate at any frequency but ultrasonic vibrations are preferred. This vibration has the effect of homogenizing and mixing the contents of the tank 10. For best effect, vibrators should be placed at both the entrance and exit points of the conduit to the tank. After leaving the tank 10, the conduit 22 empties into a storage vessel 38 for excess heating fluid. From here, the conduit 22 continues to a furnace 40 which is the fluid's primary heat source. Here the gas produced in the tank 10, consisting largely of methane, is mixed with air and combusted. The heat produced is used to heat the fluid carried in the conduit 22 while the combustion products are vented to the atmosphere through the vent 42. Combustion in the furnace 40 is enhanced by a blower 44 which is used to draw product gas directly from the tank 10 through pipeline 46 via pipelines 48 and 62. If more gas is produced then needed, the gas may be stored in the excess gas storage vessel or accumulator 50. From the furnace 40, the conduit 22 passes through supplemental heating devices at 52. In the event that there is insufficient heat supplied by the furnace 40 due to a lack of product gas, which occurs especially during the start-up phase, these devices act to maintain a constant minimum temperature in the heating fluid. Located at ground level is a solar cell unit 54 which generates power and acts in combination with an electric microwave heater at 56 to supply heat to the fluid. The microwave heater 56 is hooked up to a standard electric utility outlet and can provide all the necessary supplemental heat on cloudy days when the solar cells 54 are not functioning.

The conduit 22 then passes through a pump 58 which keeps the heating fluid circulating constantly around the conduit circuit 22.

Emanating from the tank at 60 is a gas pipeline 62 which is connected to the blower 44 via pipelines 48 and 46 and may be used to feed gas directly to the furnace 40. If more gas is being produced in the tank 10 then is immediately needed, the pump 64 is activated and the excess gas is pumped into the storage vessel or accumulator 50 under pressure. A check valve is provided at 66 to prevent this excess gas from backing into the pipeline 62. During periods of low gas output from the tank 10, the gas stored in the vessel 50 may be released through valve 68 to supply gas to the furnace 40. Also shown is a pipeline 70 which may be used to remove excess gas from the storage vessel 50 for other uses.

The liquid produced in the tank 10 can be removed without removing the top 12 of the tank 10 through pipeline 72 feeding to the liquid product storage vessel 74 where the liquid is collected and stored until needed. This liquid product may be removed through pipeline 76.

Located preferably in each of the eight corners of the rectangular tank 10 or generally thereso are radiation diffusers 78, shown in detail in FIGS. 4 and 5, each of which comprises a glass plate 80 having on one surface a grid of truncated glass cones 82. The diffuser 78 may be positioned on the bottom 19, top 12 or side walls 17 of the tank 10 in contact with the corners of the tank or positioned adjacent thereto. More diffusers may be used and positioned in other areas of the tank 10. For a tank 10 having dimensions of 8 feet × 8 feet × 16 feet, these diffusers 78 are roughly 9 inches × 12 inches in overall dimensions and contain five rows of truncated cones 82 with 12 cones 82 to the row. These diffusers 78 have a beneficial effect on the reaction occurring in the tank 10 in that they redirect and diffuse heat, electromagnetic and cosmic radiation, or the like.

In operation, the top 12 is removed and the tank 10 is filled with any type of animal or vegetable matter which can be converted into useful hydrocarbons. Garbage, surplus crops and any type of organic waste all may be included in the tank 10. To help initiate the reaction, sewage sludge can be obtained from a local sewage treatment plant and added to the raw material. With the top 12 returned to place, a reaction begins which is essentially anaerobic digestion in nature. The circulation of hot water in the conduit circuit 22 maintains the temperature at 95° F or above while the vibrating conduit 22 continuously homogenizes and mixes the tank contents. Catalysts may be added depending on the nature of the raw materials to assist in the digestive process. The reaction goes to completion in a period of time depending on the size of the tank 10, amount of catalyst, etc., at which time the tank 10 is opened, the liquid product is removed and its useful components are recovered. During the time the tank 10 is sealed and the reaction is ongoing, liquid product may be tapped off through the pipeline 72. Gas generated by the reaction is drawn off through pipeline 62 as discussed previously.

Figure 2:
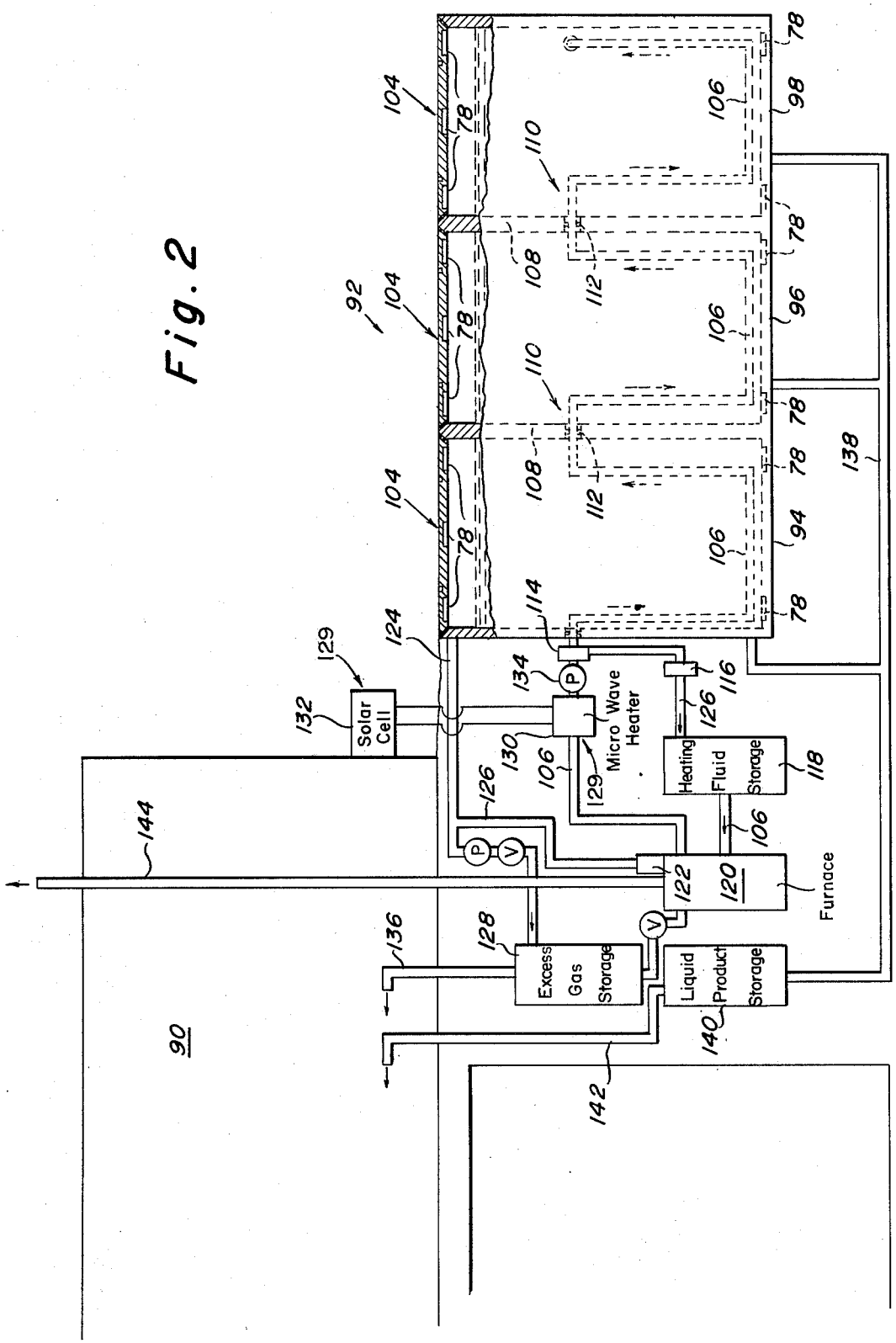
FIG. 2 is a side elevation partially in section of the apparatus of this invention used as a home waste treatment plant.
Figure 3:
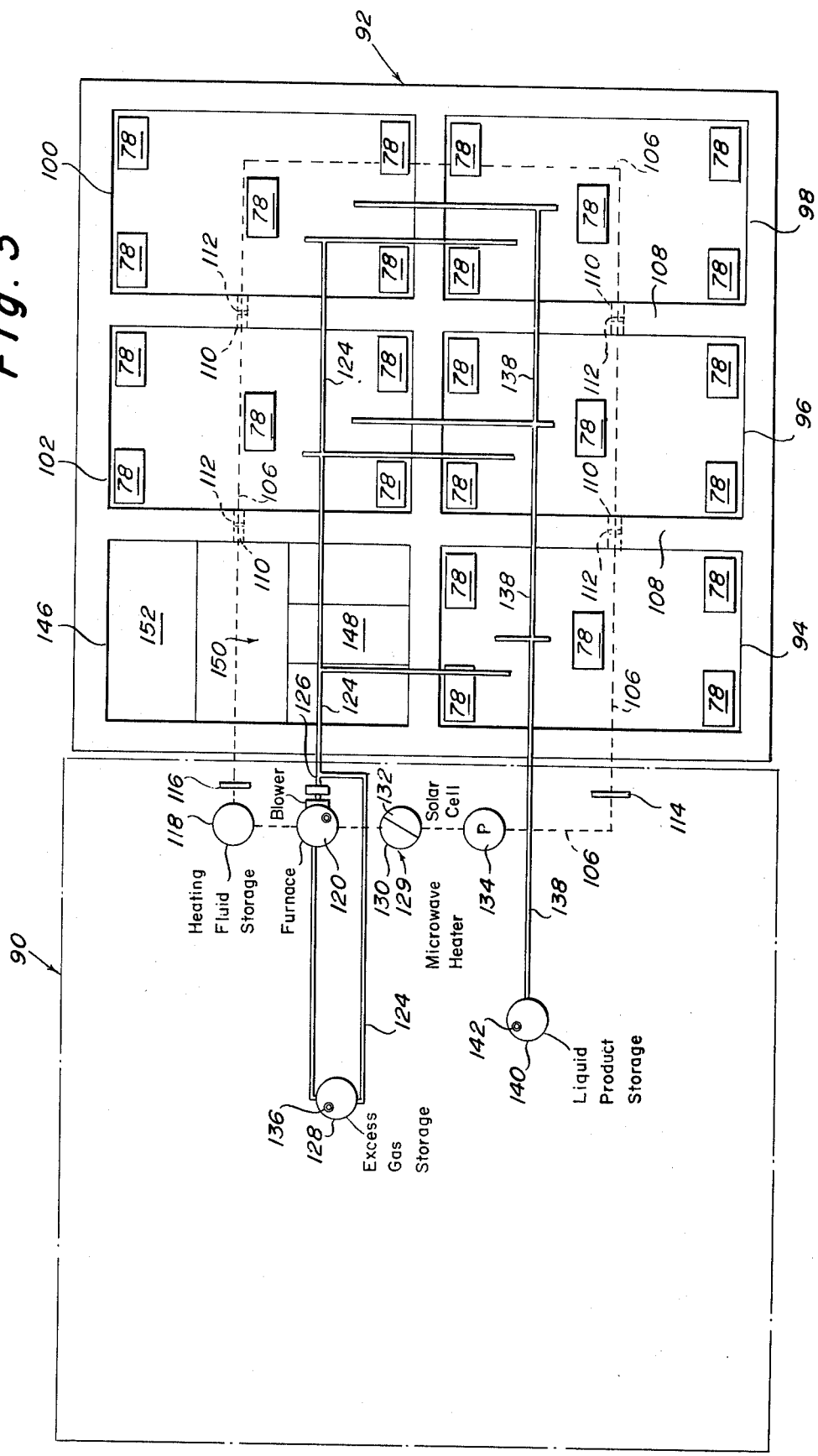
FIG. 3 is a top plan view of the apparatus of FIG. 2.

FIGS. 2 and 3 show the apparatus of this invention adapted for use as a home organic waste processing system. The home dwelling area is generally represented at 90. Six compartments formed from a single concrete mold 92 are situated in the ground with their tops 104 at ground level. Five of these compartments form a plurality of tanks 94, 96, 98, 100, 102 which are used as treatment tanks for the digestive process. The tops 104 of these five tanks 94, 96, 98, 100, 102 when in place collectively form a large flat concrete area which may be used as a patio floor. The conduit 106 travels through the five tanks 94, 96, 98, 100, 102 successively with each partition 108 separating one tank from the next containing an opening 110 through which the conduit 106 passes. Mounted in each opening 110 is a resilient seal 112 which prevents leakage between tanks and freely supports the conduit 106 so as to permit vibration of the conduit 106 by the vibrators at 114 and 116. The conduit 106 is freely suspended between the resilient seals 112 for each of the tanks 94, 96, 98, 100, 102 and is disposed in a generally U-shaped configuration in each tank so as to maximize heating efficiency in each of the tanks 94, 96, 98, 100, 102 by following the base of that tank for part of its length. Each of the tanks 94, 96, 98, 100, 102 contains the glass radiation diffusers 78 in the same array as discussed for tank 10 of FIG. 1.

All of the features of the single tank apparatus of FIG. 1 are contained here. The conduit circuit 106 feeds into the heating fluid storage vessel 118 and from there leads to the furnace 120 which is fed with the gas produced in the tanks 94, 96, 98, 100, 102, either directly by means of the blower 122 through the pipeline system 124 and pipeline 126 or via the excess gas storage vessel or accumulator 128. From the furnace 120 the conduit circuit 106 passes through the supplemental heating unit 129 which includes a microwave heater 130 and a solar cell energy device 132 in combination. At 134 is located a pump for circulating fluid in the conduit circuit 106.

The excess gaseous product stored in the vessel 128 may be distributed either to the furnace 120 or to a pipeline 136 leading outside the apparatus for independent use in the home unrelated to the functioning of the apparatus. Any excess heat generated by the furnace 120 may be conducted outside the apparatus for independent use such as heating the dwelling areas.

The liquid product of the reaction can be collected through the pipeline system 138, stored in the vessel 140 and drawn off for domestic use through pipeline 142.

The products of combustion from the furnace 120 are vented to the roof through the pipeline 144.

The portion of the conduit circuit 106 external to the plurality of tanks 94, 96, 98, 100, 102 along with all its supporting apparatus may be located in the basement of the home.

The sixth compartment 146 in the concrete mold 92 is further divided into three sections. One of these contains a septic tank or sewage disposal unit 148 into which all the toilets in the home feed. When the disposal unit 148 is full, a pump will conduct the sewage from the disposal unit 148 into one of the treating tanks 94, 96, 98, 100, 102. A second section of this sixth compartment 146 contains a water filtering and storage system 150 into which are fed all the water from sinks, bathtubs, showers and laundry. This filtered water can be used as irrigation and sprinkling water in the home owner's yard. Water from the kitchen sink or any other source with a grease content is first discharged into a grease trap before entering the water filtering and storage system 150. The third section of this compartment 146 may be located under the house itself and contain a bathing facility 152 such as a whirlpool bath.

The apparatus of this invention may be used on a much larger scale by a municipality. In describing it in terms of a rectangular concrete tank, the application in no way wishes to limit himself in this regard. The treatment tank may be of any dimension and made of any material. For instance, the treatment tank of this invention can be made on public ground by forming a long horizontal trench using a backhoe. The trench can be lined with concrete and cinderblocks and filled with organic waste material. The concrete cover over the trench can function as a bicycle path for public use. The conduit circuit can be run the length of the tank with multiple furnaces, vibrators, gas feeding devices, supplemental heating units and storage vessels located at regular intervals. This type of system can be set up along old railroad tracks, bar pits or right of ways.

Another approach is shown by FIGS. 6 and 7 in which deep vertical wells 160 are drilled into the earth to a depth of approximately 6,000 feet to form tanks with depths substantially greater than their cross-sectional dimensions. These tanks 160, which can be drilled adjacent a municipal sewage disposal plant, are filled with organic waste material and used primarily for the recovery of methane since the natural ground heat at such great depths will obviate the need for combusting the gas generated to supply heat.

Since heat need not be supplied, the copper pipe conduit circuits can be replaced by a wire loop circuit 162 suspended into each tank 160. These circuits 162 are vibrated by vibrating devices 164 adjacent each loop's entrance points 166 into its tank 160. This results in the homogenization and mixing of the contents of each tank 160. A piping system 168 for the recovery of the gas generated feeds into a storage tank 170. Radiation diffusers 172 are positioned in each top 174 and on the walls of the tanks.

While this invention has been described, it will be understood that it is capable of further modification, and this application is intended to cover any variations, uses and/or adaptations of the invention following in general, the principle of the invention and including such departures from the present disclosure as come within known or customary practice in the art to which the invention pertains, and as may be applied to the essential features hereinbefore set forth, as fall within the scope of the invention or the limits of the appended claims.

What is claimed is:

1. An apparatus for organic waste treatment comprising:
   a. a waste treatment tank,
   b. a heating fluid conduit circuit, a portion of which passes through the tank,
   c. vibratory means connected to the conduit circuit adjacent the portion of the conduit circuit which passes through the tank for vibrating the portion of the conduit circuit which passes through the tank,
   d. a pump positioned in the conduit circuit for circulating the heating fluid in the conduit circuit,
   e. a furnace positioned in the portion of the conduit circuit which is external to the tank for heating the heating fluid in the conduit circuit,
   f. feeding means interconnecting the tank and the furnace for feeding the gas generated in the tank to the furnace for combustion, and
   g. supplemental heating means positioned in the portion of the conduit circuit which is external to the tank for supplementing the heat output of the furnace.

2. The apparatus as recited in claim 1 and wherein:
   a. the vibratory means includes two vibrators, one of which is connected to the conduit circuit adjacent the conduit circuit's entrance point to the tank and the other adjacent the conduit circuit's exit point.

3. The apparatus as recited in claim 1 and wherein:
   a. the vibratory means is an ultrasonic vibratory means.

4. The apparatus as recited in claim 1 and wherein:
   a. the portion of the conduit circuit which passes through the tank is freely suspended within the tank.

5. The apparatus as recited in claim 4 and wherein:
   a. the portion of the conduit circuit which passes through the tank follows the base of the tank along part of its length.

6. The apparatus as recited in claim 1 and wherein:
   a. the portion of the conduit circuit which passes through the tank is disposed in a generally U-shaped configuration.

7. The apparatus as recited in claim 1 and including:
   a. resilient seals between the tank and the conduit circuit at the conduit circuit's entrance and exit points to the tank so as to permit free vibration of the portion of the conduit circuit which passes through the tank.

8. The apparatus as recited in claim 1 and wherein:
   a. the feeding means includes an accumulator for excess gas and a blower means for drawing gas directly from the tank into the furnace when the accumulator is empty.

9. The apparatus as recited in claim 1 and wherein:
   a. the supplemental heating means includes a solar cell energy device.

10. The apparatus as recited in claim 1 and wherein:
    a. the supplemental heating means includes a solar cell energy device and a microwave heater.

11. The apparatus as recited in claim 1 and wherein:
    a. the conduit circuit includes a heating fluid storage vessel.

12. The apparatus as recited in claim 1 and including:

a. means for collecting and storing the liquids produced in the tank.

13. The apparatus as recited in claim 1 and wherein:
a. the tank has a removable top.

14. The apparatus as recited in claim 1 and including:
a. radiation diffusers positioned in the tank.

15. The apparatus as recited in claim 14 and wherein:
a. the tank is generally rectangular in shape, and
b. the radiation diffusers are positioned generally adjacent the corners of the tank.

16. The apparatus as recited in claim 14 and wherein:
a. the tank is generally rectangular in shape, and
b. the radiation diffusers are positioned in contact with the corners of the tank.

17. An apparatus for organic waste treatment comprisng:
a. a plurality of waste treatment tanks,
b. a heating fluid conduit circuit, a portion of which passes through the plurality of tanks,
c. vibratory means connected to the conduit circuit adjacent the portion of the conduit circuit which passes through the plurality of tanks for vibrating the portion of the conduit circuit which passes through the plurality of tanks,
d. a pump positioned in the conduit circuit for circulating the heating fluid in the conduit circuit,
e. a furnace positioned in the portion of the conduit circuit which is external to the plurality of tanks for heating the heating fluid in the conduit circuit,
f. excess heat conducting means connected to the furnace for conducting excess generated heat outside of the apparatus for independent use,
g. feeding means interconnecting the plurality of tanks and the furnace for feeding the gas generated in the plurality of tanks to the furnace for combustion,
h. gas storage and distribution means interconnected with the feeding means for storing excess generated gas and distributing it to the furnace or into a pipeline leading outside the apparatus for independent use,
i. supplemental heating means positioned in the portion of the conduit circuit which is external to the plurality of tanks for supplementing the heat output of the furnace,
j. a sewage disposal unit, and
k. sewage conduction means for conducting the sewage from the sewage disposal unit into the plurality of tanks.

18. The apparatus as recited in claim 17 and wherein:
a. the vibratory means includes two vibrators, one of which is connected to the conduit circuit adjacent the conduit circuit's entrance point to the plurality of tanks and the other adjacent the conduit circuit's exit point.

19. The apparatus as recited in claim 17 and wherein:
a. the vibratory means is an ultrasonic vibratory means.

20. The apparatus as recited in claim 17 and wherein:
a. the portion of the conduit circuit which passes through the plurality of tanks is freely suspended within each tank.

21. The apparatus as recited in claim 20 and wherein:
a. the portion of the conduit circuit which passes through the plurality of tanks follows the base of each tank along part of its length.

22. The apparatus as recited in claim 17 and wherein:
a. the portion of the conduit circuit which passes through the plurality of tanks is disposed in a generally U-shaped configuration in each tank.

23. The apparatus as recited in claim 17 and including:
a. resilient seals between each tank and the conduit circuit at the conduit circuit's entrance and exit points to each of the plurality of tanks so as to permit free vibration of that portion of the conduit circuit which passes through each tank.

24. The apparatus as recited in claim 17 and wherein:
a. the gas storage and distribution means includes a blower means for drawing gas directly from the plurality of tanks into the furnace.

25. The apparatus as recited in claim 17 and wherein:
a. the supplemental heating means includes a solar cell energy device.

26. The apparatus as recited in claim 17 and wherein:
a. the supplemental heating means includes a solar cell energy device and a microwave heater.

27. The apparatus as recited in claim 17 and wherein:
a. the conduit circuit includes a heating fluid storage vessel.

28. The apparatus as recited in claim 17 and including:
a. means for collecting and storing the liquids produced in said tank.

29. The apparatus as recited in claim 17 and wherein:
a. each tank has a removable top.

30. The apparatus as recited in claim 17 and wherein:
a. radiation diffusers are positioned in each tank.

31. The apparatus as recited in claim 30 and wherein:
a. each tank is generally rectangular in shape, and
b. the radiation diffusers are positioned generally adjacent the corners of each tank.

32. The apparatus as recited in claim 30 and wherein:
a. each tank is generally rectangular in shape, and
b. the radiation diffusers are positioned in contact with the corners of the tank.

33. An apparatus for organic waste treatment comprising:
a. a vertical well for the waste to be treated having a depth substantially greater than its cross-sectional area,
b. a wire loop, a portion of which passes through the well,
c. vibratory means connected to the loop adjacent the portion of the loop which passes through the well,
d. gas recovery means connected to the well for recovering the gas generated in the well, and
e. radiation diffusers positioned in the top of the well.

* * * * *